United States Patent
Hsieh (10) Patent No.: US 8,244,214 B2
(45) Date of Patent: Aug. 14, 2012

(54) SELF-AWARE DYNAMIC AUTHORIZATION METHOD AND ARCHITECTURE FOR CLOSED FEMTOCELL ENVIRONMENTS

(75) Inventor: Tien-Yuan Hsieh, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 284 days.

(21) Appl. No.: 12/647,419

(22) Filed: Dec. 25, 2009

(65) Prior Publication Data

US 2011/0014896 A1    Jan. 20, 2011

(30) Foreign Application Priority Data

Jul. 16, 2009   (TW) .............................. 98124105 A (51) Int. Cl.
*H04M 1/66* (2006.01)
*H04W 4/00* (2009.01)
*H04W 72/00* (2009.01)

(52) U.S. Cl. .............. 455/411; 455/410; 455/432.3; 455/452.1

(58) Field of Classification Search ............. 455/41.2, 455/410–411, 415, 418, 420, 422.1, 423–425, 455/426.2, 444, 446–451, 452.1–452.2, 456.1, 455/466, 509, 550.1, 551, 552.1, 554.1, 554.2, 455/555, 556.2, 557, 561, 432.1–432.3, 433–434, 455/435.1–435.3, 453, 456.3, 456.5, 500, 455/512–514; 370/310, 328–329, 338, 341, 370/230, 252; 726/2, 21, 26–29; 380/247–250, 380/277–278

See application file for complete search history.

(56) References Cited

U.S. PATENT DOCUMENTS

| | | | |
|---|---|---|---|
| 7,487,238 B2* | 2/2009 | Pohja et al. ................ | 709/224 |
| 2002/0177440 A1* | 11/2002 | Mukherjee ................ | 455/433 |
| 2008/0162584 A1* | 7/2008 | Papili et al. ................ | 707/200 |
| 2009/0098858 A1* | 4/2009 | Gogic ........................ | 455/411 |
| 2009/0288140 A1* | 11/2009 | Huber et al. ............... | 726/2 |
| 2010/0041405 A1* | 2/2010 | Gallagher et al. ......... | 455/436 |
| 2010/0048174 A1* | 2/2010 | Osborn .................... | 455/411 |
| 2010/0130170 A1* | 5/2010 | Liu et al. .................... | 455/411 |
| 2011/0130116 A1* | 6/2011 | Yin et al. .................... | 455/411 |
| 2011/0223887 A1* | 9/2011 | Rune et al. .................. | 455/411 |

OTHER PUBLICATIONS

3GPP TS 22.220, "Service Requirements for HNBs and HeNBs.", Dec. 2009 P.9 5.3.2.Closed Subscriber Group, the Closed Subscriber Group is defined, and CSG is the problem the present case targets to solve.

(Continued)

*Primary Examiner* — Meless Zewdu
(74) *Attorney, Agent, or Firm* — Lin & Associates IP, Inc.

(57) ABSTRACT

An exemplary embodiment discloses a self-aware dynamic authorization method for closed femtocell environments. Initially, a dynamic authorization table is initialized to set authorized records of at least an authorized user equipment (UE) for a closed femtocell. When the closed femtocell provides services for the authorized UE, IMSI/MSISDN records are learned in an initial phase for learning data. The learned IMSI/MSISDN records are dynamically adjusted with the expired period of the access right on the femtocell in a reweighting phase. The expired or oldest IMSI/MSISDN records will be removed from the dynamic authorization table in an ageing phase.

22 Claims, 9 Drawing Sheets

OTHER PUBLICATIONS

3GPP TS 36.300, "E-UTRAN Overall Description.", Sep. 2009 P.67 10.5. Mobility to and from CSG cells, the description is on roaming and handover for CSG. P.155 Annex F. Mobility and Access Control Requirements associated with Closed Subscriber Group (CSG) Cells and Hybrid Cells, the description is on the mobility management and access control management of the subscribers of Closed Subscriber Group.

3GPP TS 25.467, "UTRAN Architecture for 3G HNB.", Dec. 2009 P.12 5.1.2.UE Registration: case of non CSG UEs or non CSG HNBs, the description is on the registration process of non CSG cell phone. P.13 5.1.3.UE Registration: case of CSG UEs and CSG or Hybrid HNBs, the description is on another registration process of CSG cell phone.

3GPP TS 25.469, "UTRAN Iuh Interface HNB Application Part.", Dec. 2009 V9.0.0, there is no description relevant to the present case.

3GPP TS 24.285, "Allowed CSG List Management Object.", Dec. 2009 P.6 4.1.Allowed CSG List Management Object, the figure showing the structure of Allow CSG List Management Object is different from our proposed Queue structure. P.6~P.10 5.Management Object Parameters, the description shows how 3GPP realizes Management Object.

* cited by examiner

FIG. 1 (PRIOR ART)

| IMSI | MSISDN | START TIME | DURATION |
|---|---|---|---|
| IMSI_1 | MSISDN_1 | 09/01/05 00:00:00 | * (PERMANENT ACCESS) |
| IMSI_2 | MSISDN_2 | 09/01/10 00:00:00 | * |
| IMSI_3 | MSISDN_3 | 09/01/30 09:00:00 | - (REJECT ACCESS) |
| IMSI_4 | MSISDN_4 | 09/02/03 00:00:00 | 10:00:00 |

SELF-AWARE DYNAMIC AUTHORIZATION METHOD AND ARCHITECTURE FOR CLOSED FEMTOCELL ENVIRONMENTS

TECHNICAL FIELD

The disclosure generally relates to a self-aware dynamic authorization method and architecture for closed femtocell environments.

BACKGROUND

According to the telecommunication statistics, the majority of wireless communication traffic occurs indoors, while only a small percentage occurs outdoors or during travelling at high speed. The telecommunication service providers need to find an effective way to balance the two conditions when deploying macrocell stations. The emergence of femtocells solves these problems. A femtocell is a family type station, allowing only a few cell phones to access. Because a femtocell is a low power transmitter, with coverage area of about 30-70 square meters, the femtocell may reduce the resistance faced by the telecommunication service providers during deployment. The deployment of a large number of femtocells may enhance the wireless signal quality in indoor environments, and improve the frequency utilization efficiency. Because of low cost in deployment and management, using a femtocell is becoming a popular solution adopted by the telecommunication service providers.

Figure 1:
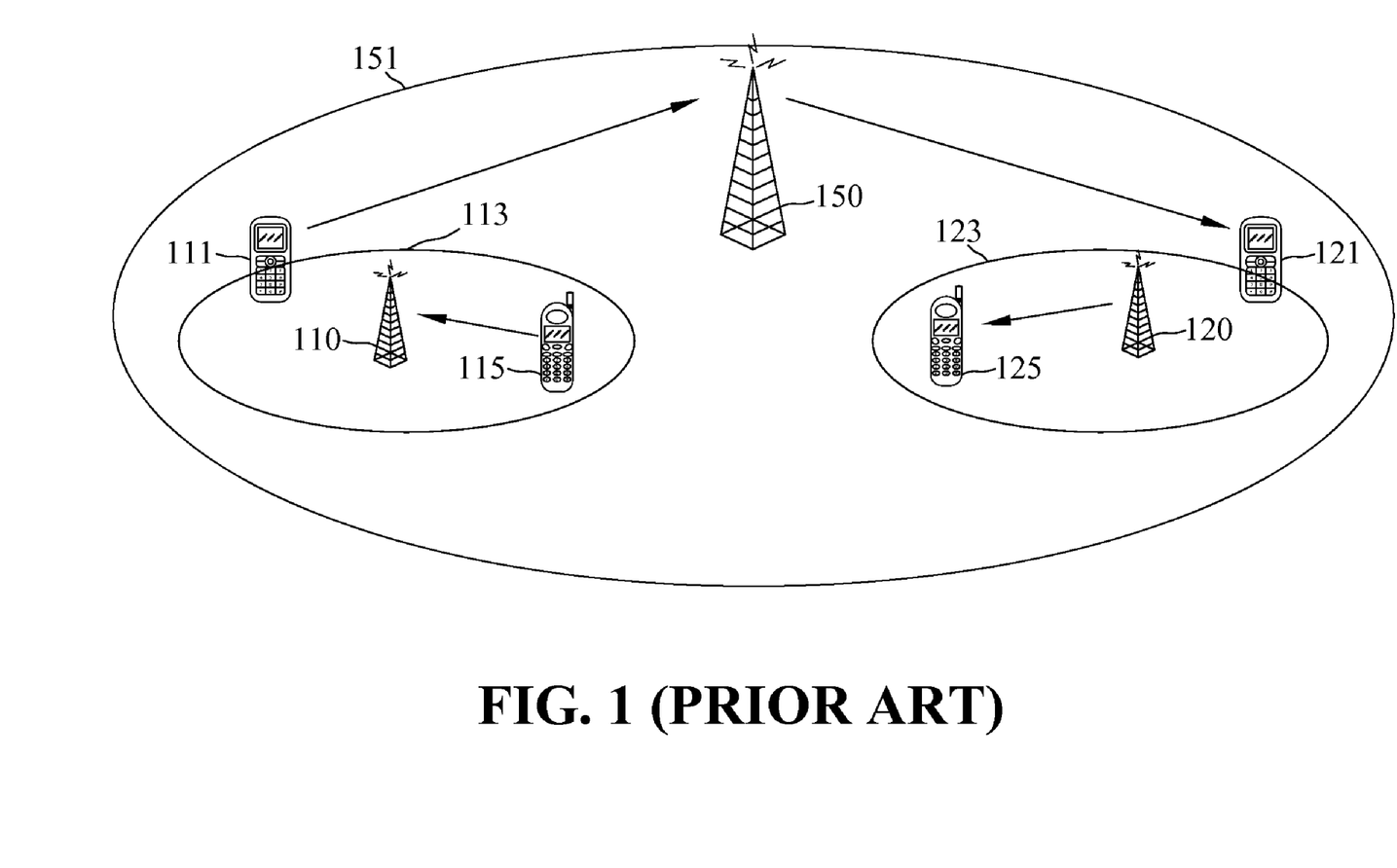
FIG. 1 shows an exemplary schematic view of the two mutual interference scenarios between a macrocell and femtocells.

As the femtocell is the station for indoor use, the authorization and authentication issues are incurred. The closed femtocell allows only the family members or authorized cell phones to access and to obtain services. Because of the authorization issues of the closed femtocell, the non-family-members or non-authorized cell phones may only access the large-area macrocells and a small number of open femtocells. When the on-authorized cell phones roam to a closed femtocell, the access process between the cell phones and the macrocells will interfere with the area of the closed femtocell. On the other hand, the attempt of the femtocell to improve the signal quality will interfere with the access connection between the cell phones and the macrocells. FIG. 1 shows two scenarios of mutual interference between a macrocell and femtocells.

In FIG. 1, macrocell 150 covers the area that includes two closed femtocells 110, 120, with two non-authorized cell phones 111, 121 and two authorized cell phones 115, 125. Cell phones 111, 121 roam into coverage areas 113, 123 of femtocells 110, 120 respectively. Because cell phone 111 cannot access femtocell 110, cell phone 111 may only access coverage area 151 of macrocell 150. When cell phone 111 needs to uplink a large amount of data to macrocell 150, the uplink period will severely interfere with the signal quality of cell phone 115 accessing femtocell 110. This is called uplink interference, and uplink interference degrades the service quality of femtocell 110.

The other scenario is that when femtocell 120 needs to transmit a large amount of information to authorized cell phone 125, the transmission will also interfere with the signal quality of non-authorized cell phone 121 receiving from macrocell 150. This is called downlink interference. When the mutual interferences between two closed femtocells 110, 120 occur, the interference storms are formed.

The current standards and known mechanisms require manual configuration to operate the closed femtocell and set the acceptable International Mobile Subscriber Identity (IMSI)/Mobile Station International Subscriber Directory Number (MSISDN). The femtocells do not include a self-aware and dynamic authorization mechanism to solve the interference situations.

SUMMARY

The disclosed exemplary embodiments may provide a self-aware dynamic authorization method and architecture for closed femtocell environments.

In an exemplary embodiment, the disclosed relates to a self-aware dynamic authorization method for closed femtocell environments. The method comprises: executing an initialization of a dynamic authorization table to configure the authorization record of at least an admissible user of a closed femtocell; through the execution of an initial phase for learning data, obtaining the IMSI/MSISDN record learned by the closed femtocell using service experiences; through the execution of a reweighting phase, dynamically adjusting an expiration period of the access right for the learned IMSI/MSISDN record to the closed femtocell; and through the execution of an ageing phase, deleting the expired or at least an oldest IMSI/MSISDN record.

In another exemplary embodiment, the disclosed relates to a self-aware dynamic authorization architecture for closed femtocell environments. The architecture comprises a first group, a second group and a dynamic authorization module. The first group consists of the authorization records of at least an admissible user of a closed femtocell. The second group consists of the learned dynamic authorization records of the closed femtocell when providing telecommunication services to the at least an admissible user. The dynamic authorization module, after setting the authorization record of the first group, continues to execute an initial phase for learning data, a reweighting phase and an ageing phase, to establish or dynamically adjust the dynamic authorization records of the second group.

The foregoing and other features, aspects and advantages of the present invention will become better understood from a careful reading of a detailed description provided herein below with appropriate reference to the accompanying drawings.

DETAILED DESCRIPTION OF THE EXEMPLARY EMBODIMENTS

The disclosed exemplary embodiments may provide a self-aware dynamic authorization method and architecture for closed femtocell environments. The self-aware dynamic authorization method designs a dynamic authorization table for a closed femtocell, and provides self-aware capability to the closed femtocell according to the human behavior and the telecommunication process of the owner of the closed femtocell, such as an authorized handheld device using the femtocell to initiate a call, receive a call, receive a text message, etc., so as to obtain the IMSI/MSISDN records of the non-authorized handheld devices to establish or adjust dynamic authorization information.

The self-aware dynamic authorization method also provides an authorization way to reduce the interference between the handheld device and the femtocell. The authorization way lets a non-authorized handheld device have an access right to the femtocell when entering the service coverage of the femtocell. In other words, the closed femtocell may immediately provide access services.

Figure 2:
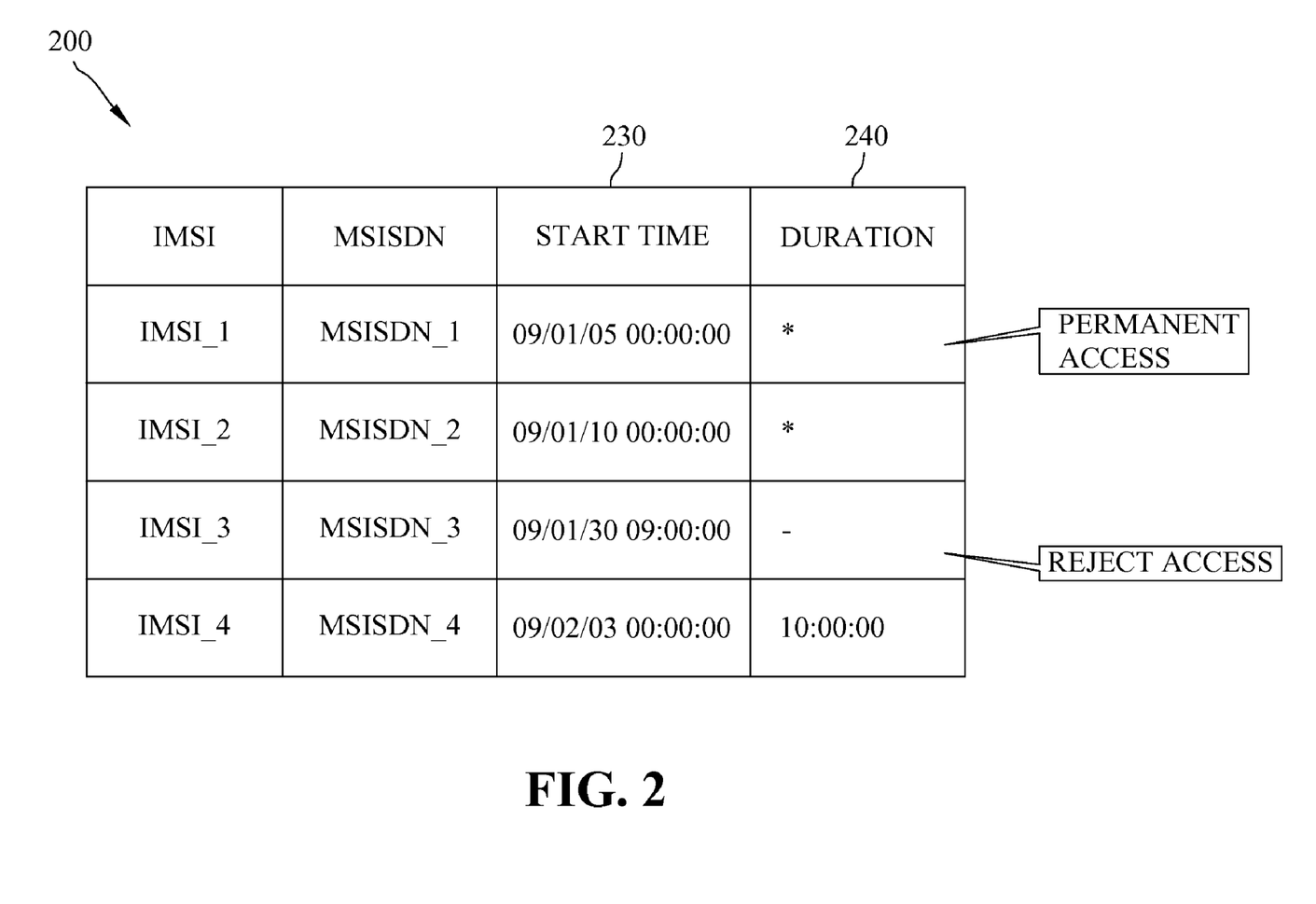
FIG. 2 shows an exemplary schematic view, illustrating the structure of a dynamic authorization table, consistent with certain disclosed embodiments.

After the user purchases a closed femtocell, the user may set the initial value of each field of the dynamic authorization table during the step of initializing dynamic authorization table. FIG. 2 shows an exemplary schematic view, illustrating the structure of a dynamic authorization table, consistent with certain disclosed embodiments. As shown in FIG. 2, dynamic authorization table 200 includes four fields, where the first and the second fields are key fields, for storing MSISDN and IMSI of an admissible user (such as, the user and the family members), respectively. The third field is the start time field 230, for storing the start time of the most recent obtaining or serving the IMSI/MSISDN by the closed femtocell. The fourth field is duration field 240, for storing the duration of the IMSI/MSISDN in the dynamic authorization table.

In the exemplar of FIG. 2, dynamic authorization table 200 includes four IMSI/MSISDN records. The contents of first key field IMSI of dynamic authorization table are from IMSI_1 to IMSI_4, respectively. The contents of second key field MSISDN are from MSISDN_1 to MSISDN_4, respectively. Take the third IMSI/MSISDN record as example. The most recent record of closed femtocell obtaining or serving IMSI_3/MSISDN_3 is at the time 09/01/30 09:00:00, as shown in the third field of the third IMSI/MSISDN record. The fourth field of IMSI_3/MSISDN_3 record is "-", indicating non-admissible to access the femtocell. Take the first IMSI/MSISDN record as example. The fourth field corresponding to the IMSI_1/MSISDN_1 is "*", indicating permanently accessing the femtocell. Take the fourth IMSI/MSISDN record as example. The fourth field of IMSI_4/MSISDN_4 is 10:00:00, indicating that the duration admissible in the dynamic authorization table is 10 hours.

Figure 3:
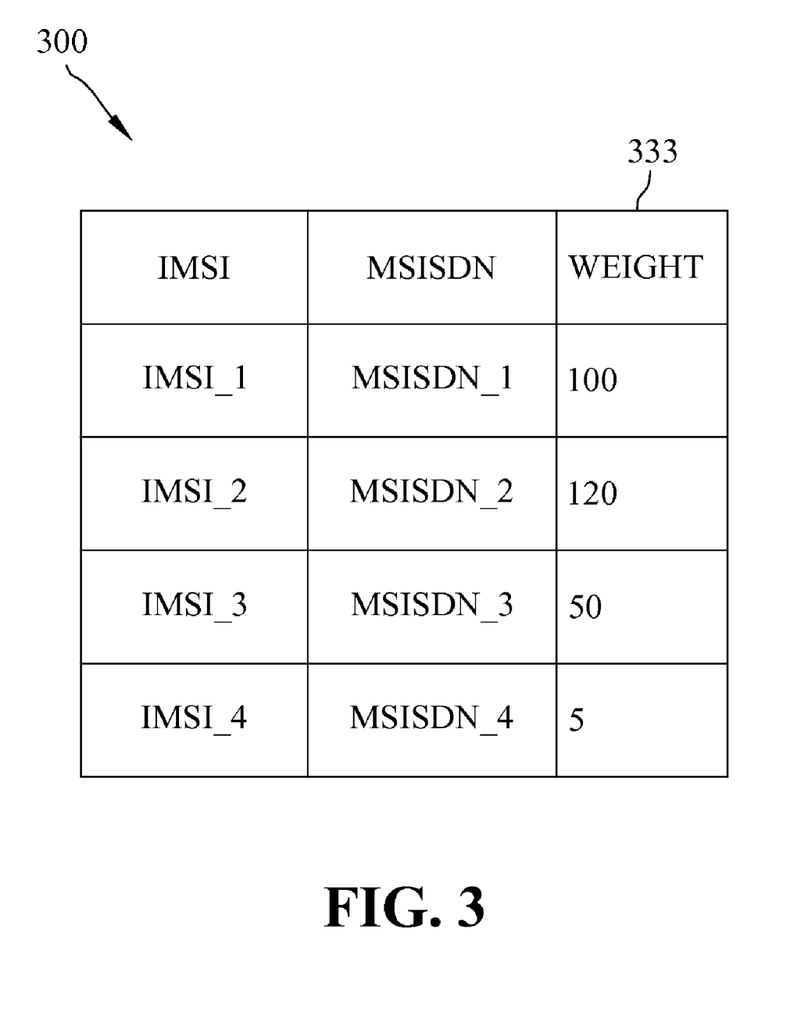
FIG. 3 shows another exemplary schematic view, illustrating the structure of a dynamic authorization table, consistent with certain disclosed embodiments.

FIG. 3 shows another exemplary schematic view, illustrating the structure of a dynamic authorization table, consistent with certain disclosed embodiments. In comparison with the exemplar of FIG. 2, dynamic authorization table 300 of the exemplar in FIG. 3 gives a weight to each IMSI/MSIDSDN record. In other words, weight field 333 replaces the start time field and the duration field of FIG. 2. The assignment of weight to each IMSI/MSISDN record will be described with the self-aware dynamic authorization method of the disclosed exemplary embodiments later.

Figure 4:
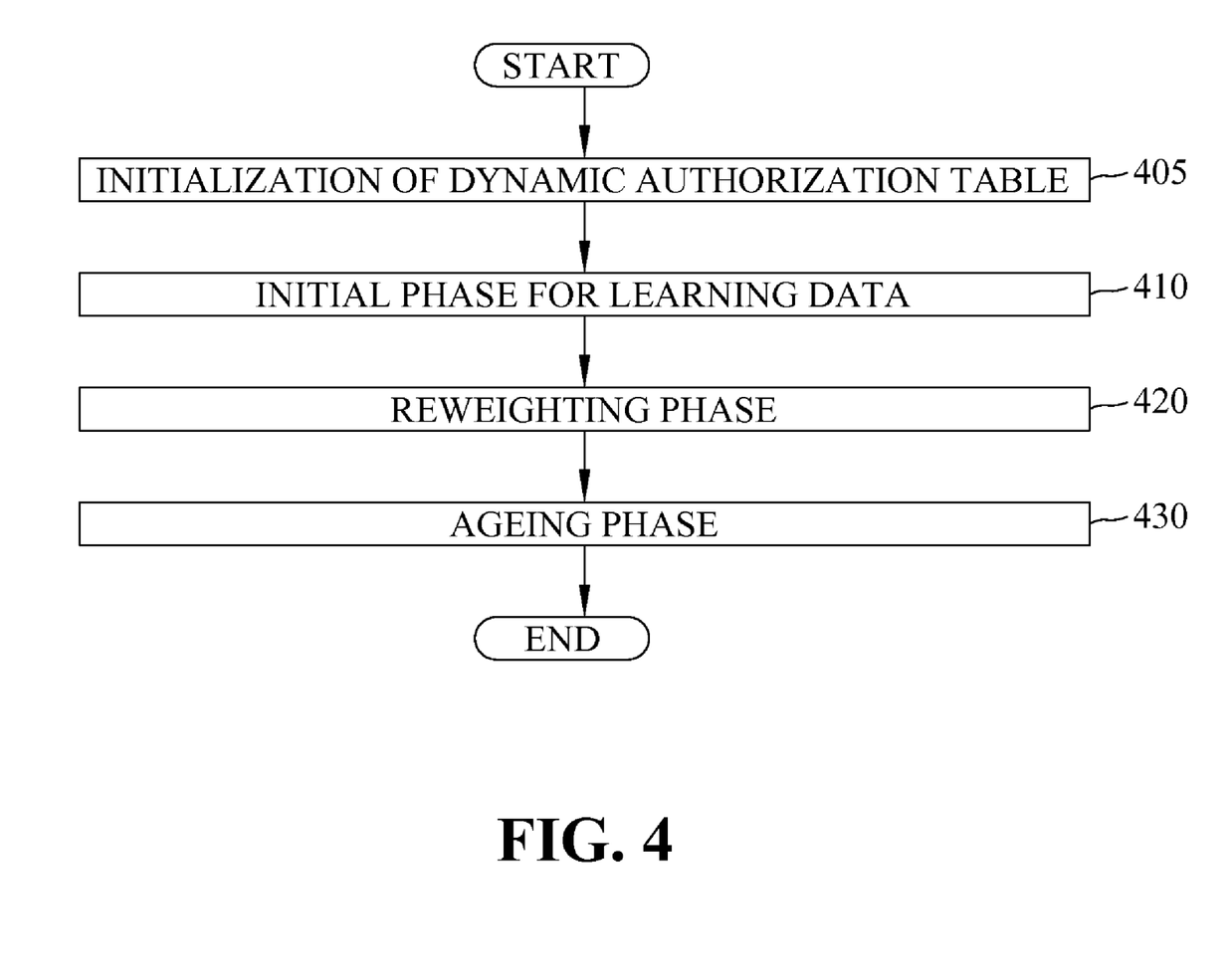
FIG. 4 shows an exemplary schematic view, illustrating each phase of a self-aware dynamic authorization method for closed femtocell environments, consistent with certain disclosed embodiments.

FIG. 4 shows an exemplary schematic view, illustrating each phase of a self-aware dynamic authorization method for closed femtocell environments, consistent with certain disclosed embodiments. Referring to FIG. 4, during the step 405 to initialize dynamic authorization table, it may set each admissible user of the femtocell as being permanently accessing the closed femtocell or set the weight of each admissible user as infinitive.

After step 405 of initializing dynamic authorization table, it may continue to execute an initial phase 410 for learning data, a reweighting phase 420 and an ageing phase 430 to accomplish the disclosed self-aware dynamic authorization method. Through step 405 of initialization of dynamic authorization table, an authorization record of at least an admissible user of a closed femtocell is set. The execution of initial phase for learning data 410 may obtain the IMSI/MSISDN record learned by the femtocell using service experiences. The execution of reweighting phase 420 may dynamically adjust the duration/expiration of the access of the learned IMSI/MSISDN record to the femtocell. The execution of ageing phase 430 may delete the expired or oldest IMSI/MSISDN records.

The following uses the structure of the exemplary dynamic authorization table of FIG. 2 as an example to describe the operations of the three phases.

In the initial phase 410 of learning data, when the femtocell provides telecommunication services to the admissible user, such as, a family member making calls, receiving calls, texting or receiving texting, and so on, the femtocell may learn the MSISDN of the opposite party because the message constructed by the signaling/command includes MSISDN of the caller/callee. Then, the femtocell may inquire home location register (HLR) via a mapping protocol to find the correspondence of IMSI and MSISDN of the opposite party, and compare with the records in the dynamic authorization table. If the IMSI/MSISDN is not in the dynamic authorization table, a new record of this MSI/MSISDN is added to the dynamic authorization table. If the IMSI/MSISDN is already in the dynamic authorization table, the start time in the start time field of the IMSI/MSISDN record of the dynamic authorization table is updated.

In the dynamic authorization table, the start time field is to record the time that the femtocell learns the MSISDN, such as cell phone number, of the handheld device. Because the dynamic authorization table of the disclosed exemplary embodiments includes an expiration control mechanism, i.e., duration, the most recent service or learning time in the femtocell must be updated for the same MSISDN.

Figure 5:
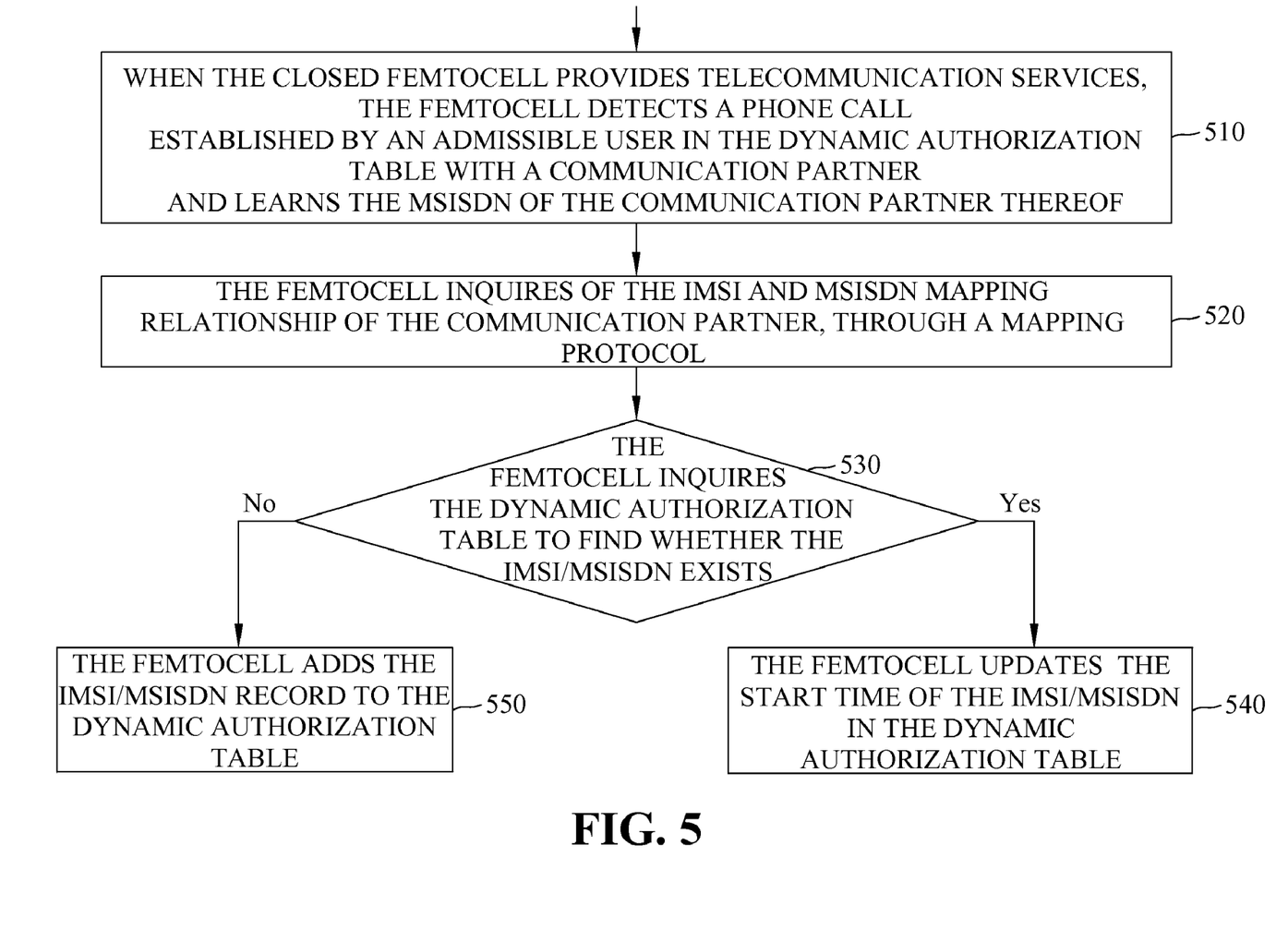
FIG. 5 shows an exemplary flowchart, illustrating the initial phase for learning data, consistent with certain disclosed embodiments.

FIG. 5 shows an exemplary flowchart, illustrating the initial phase for learning data, consistent with certain disclosed embodiments. Referring to FIG. 5, in step 510, when the closed femtocell provides telecommunication services, the femtocell detects a phone call established by an admissible user in the dynamic authorization table with a communication partner and learns the MSISDN of the communication partner thereof. In step 520, the femtocell inquires of the IMSI and MSISDN mapping relationship of the communication partner, through a mapping protocol. In step 530, the femtocell inquires the dynamic authorization table to find whether the IMSI/MSISDN exists. If so, the femtocell updates the start time of the IMSI/MSISDN in the dynamic authorization table, as shown in step 540. Otherwise, the femtocell adds the IMSI/MSISDN record to the dynamic authorization table, as shown in step 550. Hence, after the admissible user uses the telecommunication services provided by the femtocell, the communication partner may access the closed femtocell.

Figure 6:
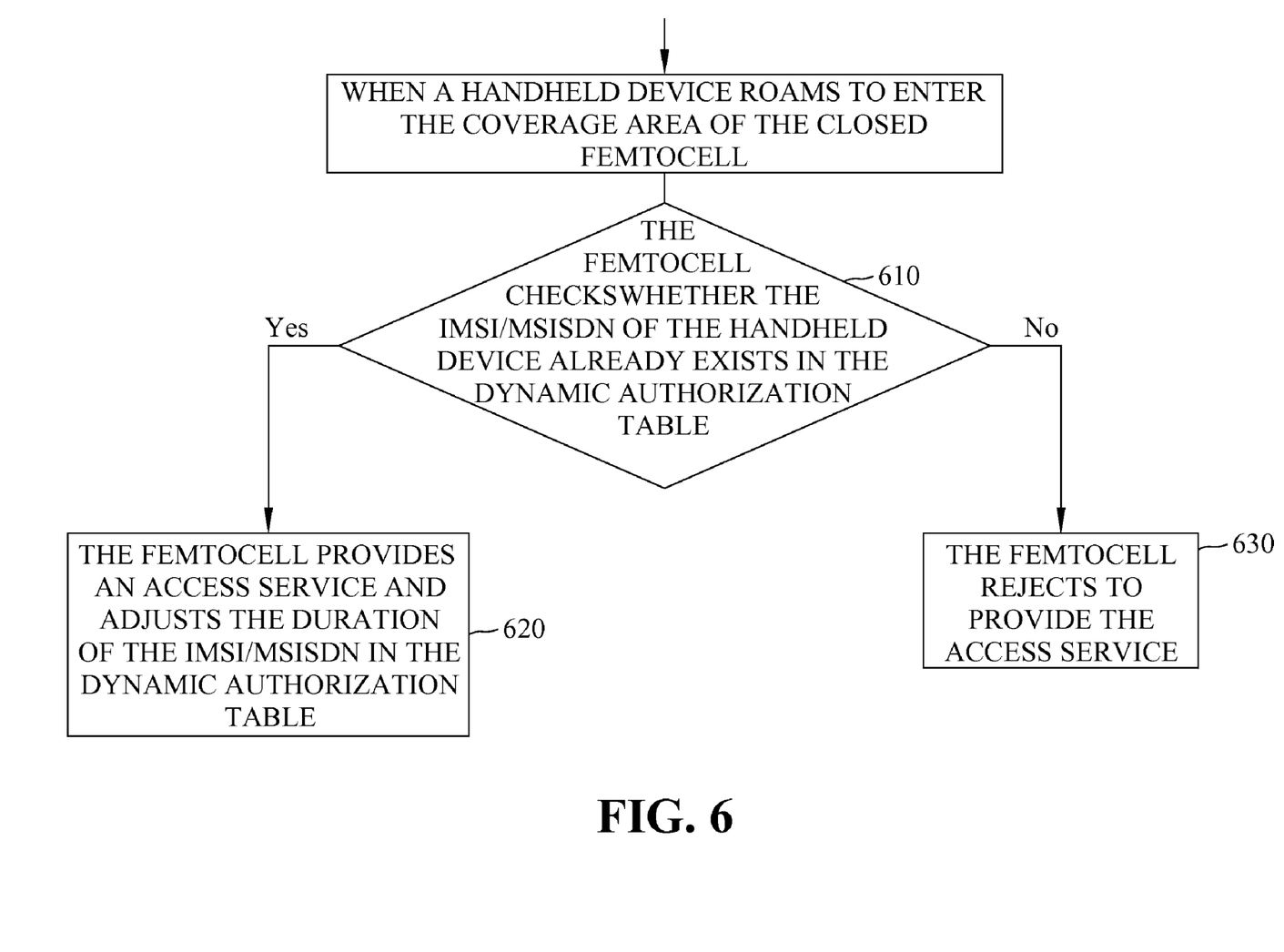
FIG. 6 shows an exemplary flowchart, illustrating the reweighting phase, consistent with certain disclosed embodiments.

After completing the initial phase for learning data, the self-aware dynamic authorization method of the disclosed exemplary embodiments enters the reweighting phase. FIG. 6 shows an exemplary flowchart, illustrating the reweighting phase, consistent with certain disclosed embodiments. When a handheld device, such as a cell phone, roams to enter the coverage area of the closed femtocell, the femtocell first checks whether the IMSI/MSISDN of the handheld device already exists in the dynamic authorization table, as shown in step 610. If so, the femtocell provides an access service and adjusts the duration of the IMSI/MSISDN in the dynamic authorization table, as shown in step 620. Otherwise, the femtocell rejects to provide the access service, as shown in step 630.

In the dynamic authorization table, the duration field may record the duration of which the IMSI/MSISDN of the handheld device will be stored in the dynamic authorization table, starting with the start time and counting forwards. Therefore, the more often the IMSI/MSISDN of the same handheld device visits, the duration will become longer. In other words, in step 620, the femtocell will increase the duration of the IMSI/MSISDN as the handheld device of the IMSI/MSISDN visits more often. Hence, the possibility that the IMSI/MSISDN is removed in a short period of time is prevented. In step 630, the femtocell rejects to provide the access service, may also use short message service (SMS) to notify the femtocell administrator. Therefore, the authorized access records will automatically change the contents as the behavior of the handheld device evolves with time.

Figure 7:
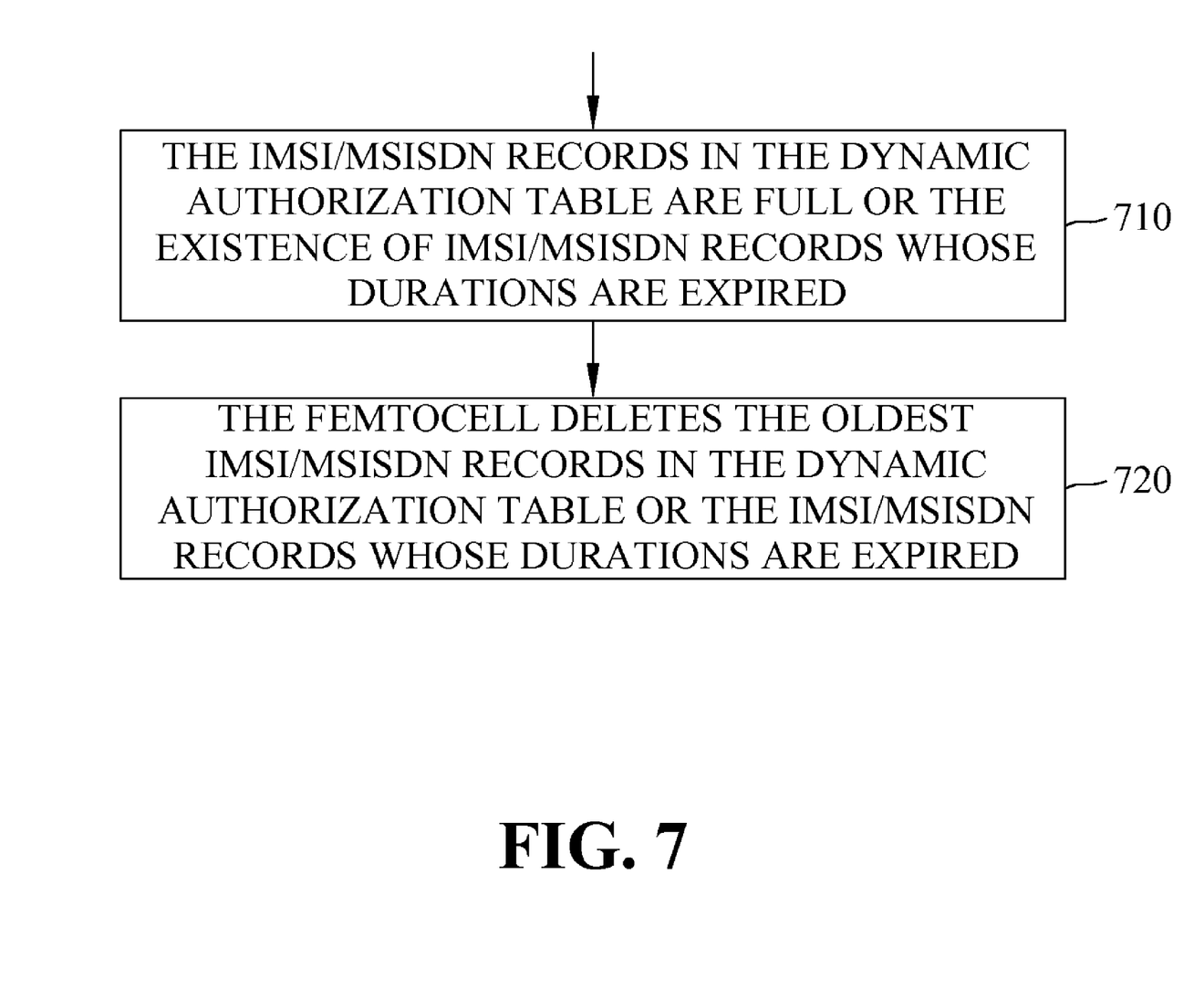
FIG. 7 shows an exemplary flowchart, illustrating the ageing phase, consistent with certain disclosed embodiments.

In ageing phase 430, the disclosed exemplary embodiments will delete the oldest IMSI/MSISDN records in the dynamic authorization table, or the IMSI/MSISDN records whose durations are expired. FIG. 7 shows an exemplary flowchart, illustrating the ageing phase, consistent with certain disclosed embodiments. When the IMSI/MSISDN records in the dynamic authorization table are full or the existence of IMSI/MSISDN records whose durations are expired (step 710). The femtocell deletes the oldest IMSI/MSISDN records in the dynamic authorization table or the IMSI/MSISDN records whose durations are expired (step 720).

Figure 8:
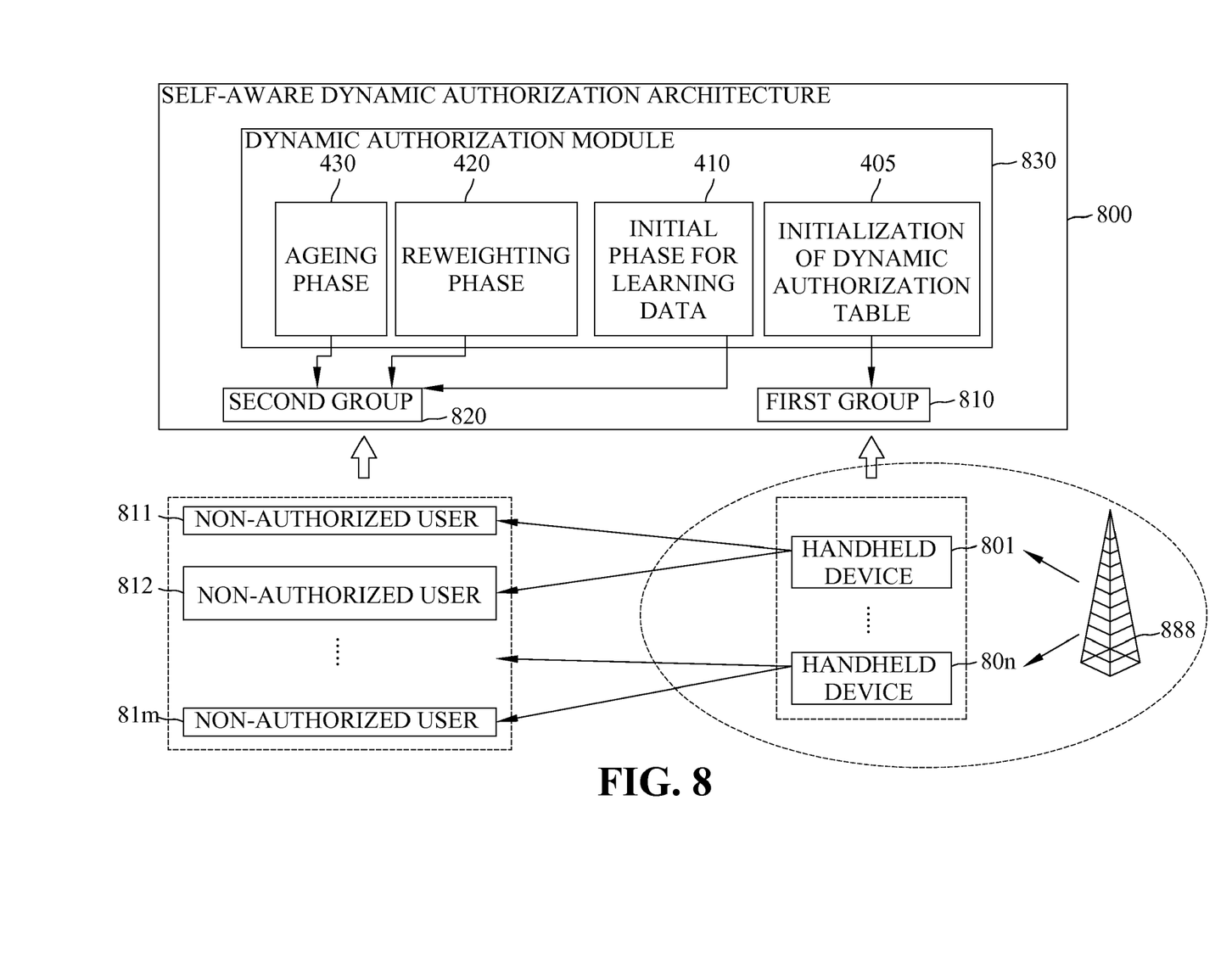
FIG. 8 shows an exemplary schematic view of a self-aware dynamic authorization architecture for closed femtocell environments, consistent with certain disclosed embodiments.

As aforementioned, the structure of the dynamic authorization table includes two groups of IMSI/MSISDN records. The first group records the IMSI/MSISDN of the family members. This may be set, added or deleted by the femtocell administrator or the telecommunication service provider. The second group is the IMSI/MSISDN records learned by the closed femtocell through the service experiences. Hence, the disclosed exemplary embodiments may use an architecture to allow the closed femtocell to have the aforementioned self-aware dynamic authorization capability. FIG. 8 shows an exemplary schematic view of a self-aware dynamic authorization architecture for closed femtocell environments, consistent with certain disclosed embodiments.

Referring to FIG. 8, self-aware dynamic authorization architecture 800 may comprise a first group 810, a second group 820 and a dynamic authorization module 830. First group 810 consists of the authorization records of at least an admissible user, such as handheld 801-80n, of a closed femtocell 888. Second group 820 consists of the dynamic authorization records of non-authorized users 811-81n learned by closed femtocell 888 when providing telecommunication services to the at least an admissible user. Dynamic authorization module 830, after setting first group 810, executes initial phase for learning data 410, reweighting phase 420 and ageing phase 430 to establish or dynamically adjust the authorization records of second group 820.

As shown in the examples of FIG. 3 and FIG. 4, each dynamic authorization record of first group 810 and second group 820 includes at least two key fields (IMSI/MSISDN) and expiration control information. The expiration control information may be achieved with a start time field and a duration field, or with weight information.

In the exemplary embodiments, the data structure of the authorization record of first group 810 and second group 820, and the operation of dynamic authorization module 830 may be realized with the authorization module of two types of data structures. One is the authorization module with queue structure and the other is the authorization module with weighting structure. The following describes the two authorization modules.

Figure 9:
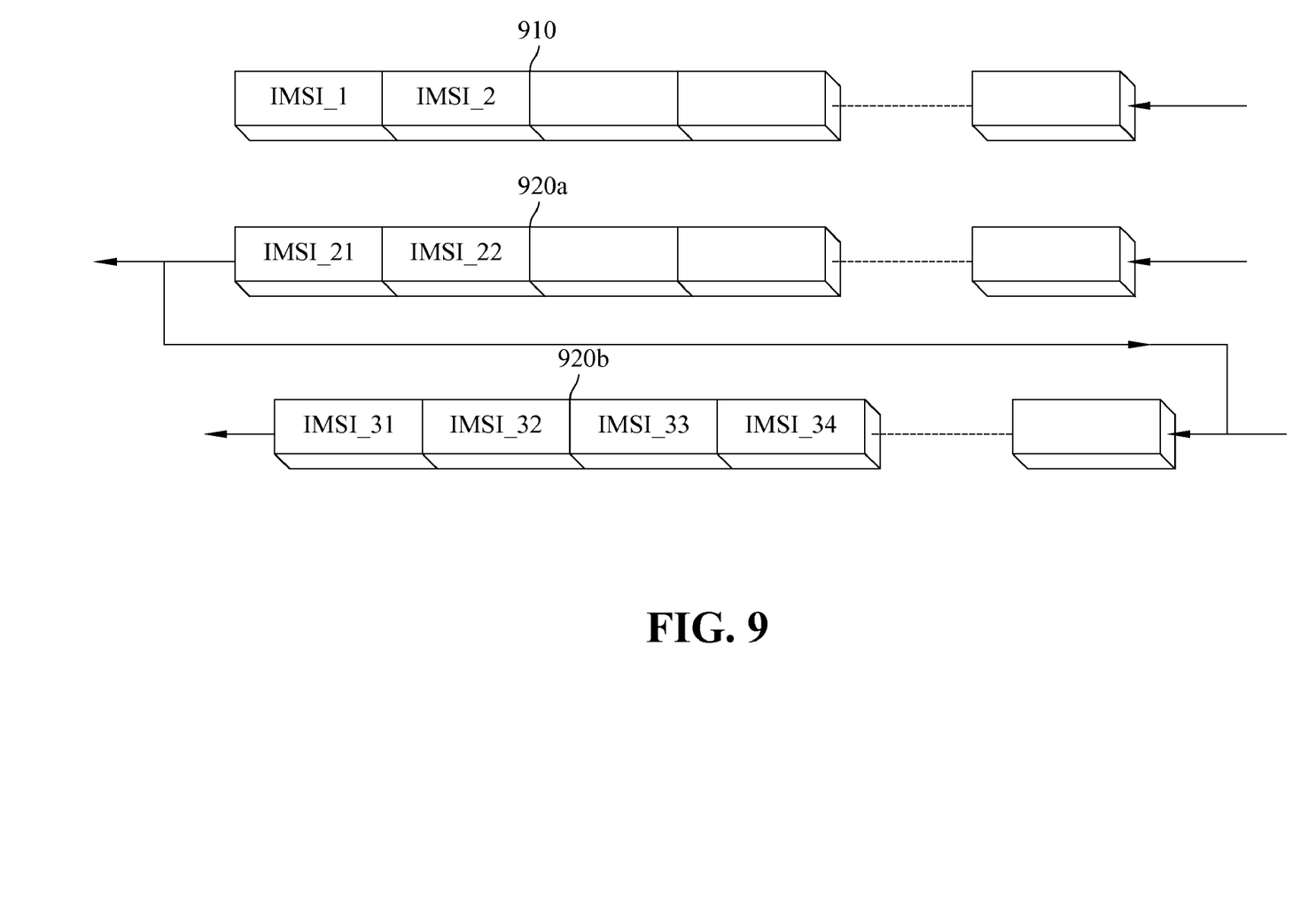
FIG. 9 shows an exemplary schematic view, illustrating authorization module with queue structure, consistent with certain disclosed embodiments.

FIG. 9 shows an exemplary schematic view, illustrating authorization module with queue structure, consistent with certain disclosed embodiments. Referring to FIG. 9, first group consists of a queue 910 formed by authorization records of at least an admissible user, marked as IMSI_1 to IMSI_N. where N is an integer greater than or equal to 1. The content of each authorization record IMSI_J of queue 910 may be set, added or deleted by the femtocell administrator or telecommunication service provider. The expiration control information may be set as a fixed value or a special symbol to indicate permanent access to the closed femtocell. Second group may be divided into two queues, operated by dynamic authorization module 830. One queue 920a is called aware queue, and the other queue 920b is called service queue.

The operation of dynamic authorization module 830 on queue 920a is corresponding to the operation on the start time field of the dynamic authorization table. Hence, in the initial phase for learning data, dynamic authorization module 830 only operates on queue 920a. According to the exemplary flowchart of FIG. 5, if queue 920a does not include the IMSI record after the inquiry step 530, dynamic authorization module 830 adds a new IMSI record to the end of queue 920a. If the IMSI already exists in queue 920a, dynamic authorization module 830 moves the IMSI record to the end of queue 920a and the operation corresponds to updating the start time of IMSI/MSISDN. Also, this start time is the most recent time that the femtocell obtains or serves an IMSI during learning. Therefore, the end of queue 920a has the latest start time among all the IMSI records.

In the reweighting phase, according to the exemplary flowchart of FIG. 6, if an IMSI record of a handheld device is found in queue 920a or queue 920b after the inquiry step 610, dynamic authorization module 830 moves the IMSI record to the end of queue 920b and the operation corresponds to greatly increasing the duration of IMSI/MSISDN.

In ageing phase, according to the exemplary flowchart of FIG. 7, the first IMSI record of queue 920b will be moved to the end of queue 920a or the first IMSI record of queue 920a will be deleted.

Accordingly, queue 920a and queue 920b, in combination with the operation of dynamic authorization module 830, may realize the dynamic authorization of a closed femtocell.

When using weighting queue to realize the dynamic authorization of a closed femtocell, the exemplary dynamic authorization table of FIG. 3 may be used, in combination with the operation of dynamic authorization module 830. A weight field is assigned to each IMSI/MSISDN record. The weight field may replace the start time field and the duration field to achieve the equivalent dynamic authorization capability. Each IMSI/MSISDN record of the first group has infinity as the weight. The second group, in combination with the operation dynamic authorization module 830, uses different weight values to replace the start time field and the duration field. The relation between the weight value and the start time and duration as well as the operation of dynamic authorization module 830 will be described as follows, where X represents the weight of duration and Y is the weight of start time.

In the initial phase for learning data, according to the exemplary flowchart of FIG. 5, if an IMSI record does not exist in dynamic authorization table 300 after inquiry step 530, dynamic authorization module 830 adds a new IMSI/MSISDN record to dynamic authorization table 300, with initial weight value as Y. If the IMSI/MSISDN record already exists in dynamic authorization table 300, dynamic authorization module 830 increases the weight of the IMSI record with Y.

In reweighting phase, according to the exemplary flowchart of FIG. 6, if an IMSI record of a handheld device is found in dynamic authorization table 300, dynamic authorization module 830 increases the weight of the IMSI record with X.

In ageing phase, after each period of time, dynamic authorization module subtracts a constant value, such as, 1, from the weight of each IMSI/MSISDN record in dynamic authorization table 300. When dynamic authorization table 300 is full, dynamic authorization module 830 deletes the IMSI/MSISDN record with the least weight value.

In summary, the disclosed exemplary embodiments may provide a self-aware dynamic authorization method and architecture for closed femtocell environments. The exemplary embodiments use the self-aware and dynamic authorization capabilities of the femtocell during the telecommunication services, to obtain the IMSI and MSISDN of the non-authorized user equipment, such as cell phone, of the communication partner. When this user equipment enters the coverage area of the femtocell, this user equipment already has the access right to the femtocell. In this manner, the situation of invalid access of handheld devices and interference may be greatly reduced, and the signal quality may be improved.

Although the disclosed has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A self-aware dynamic authorization method for closed femtocell environments, comprising:
   executing initialization of a dynamic authorization table using a dynamic authorization module configured by a hardware processor, for setting an authorization record in said dynamic authorization table for each of at least an admissible user of a closed femtocell, said authorization record having a Mobile Station International Subscriber Directory Number (MSISDN) field, an International Mobile Subscriber Identity (IMSI) field, a start time field and a duration field;
   executing an initial phase for learning data using the dynamic authorization module, learning to obtain an International Mobile Subscriber Identity (IMSI) or a Mobile Station International Subscriber Directory Number (MSISDN) of each non-authorized user for adding or updating a corresponding authorization record with said IMSI or said MSISDN learned by said closed femtocell through service experiences;
   executing a reweighting phase using the dynamic authorization module, for reweighting each non-authorized user by dynamically adjusting a duration of access to said closed femtocell for each non-authorized user, said duration of access being recorded in said duration field in the corresponding authorization record; and
   executing an ageing phase using the dynamic authorization module, for deleting the authorization record with an expired duration of access or an oldest start time from said dynamic authorization table;
   wherein in each said authorization record, said MSISDN field and said IMSI field are key fields, said start time field records a start time when said closed femtocell most recently obtains or serves a corresponding user, and said duration field records the duration of access authorized to the corresponding user.

2. The method as claimed in claim 1, wherein during said initialization of said dynamic authorization table, said authorization record for each of said at least an admissible user is set, added or deleted by an administrator of said closed femtocell or a telecommunication service provider.

3. The method as claimed in claim 1, wherein executing said initial phase for learning data further includes:
   for each admissible user in said dynamic authorization table, during provision of telecommunication services by said closed femtocell, detecting said each admissible user using said telecommunication services to establish a message with a communication partner, and learning said MSISDN of said communication partner;
   inquiring mapping relationship between said IMSI and said MSISDN of said communication partner; and
   inquiring whether said IMSI or said MSISDN of said communication partner exists in one of the authorization records in said dynamic authorization table; if so, updating said start time field in the existing authorization record in said dynamic authorization table; otherwise, adding a new authorization record with said IMSI or said MSISDN in said dynamic authorization table.

4. The method as claimed in claim 1, wherein executing said reweighting phase further includes:
   when a handheld device enters a coverage area of said closed femtocell, said closed femtocell checking whether said IMSI or said MSISDN of said handheld device exists in one of the authorization records in said dynamic authorization table; and
   if so, said closed femtocell providing an access service to said handheld device and updating said duration field in the existing authorization record of said handheld device in said dynamic authorization table; otherwise, said closed femtocell rejecting to provide said access service.

5. The method as claimed in claim 1, wherein executing said ageing phase further includes:
   when said dynamic authorization table is full or there is at least an authorization record with the expired duration of access, deleting the authorization record with the oldest start time or the expired duration of access from said dynamic authorization table.

6. The method as claimed in claim 4, wherein said duration field in the existing authorization record of said handheld device has a value proportional to a number of times that said handheld device visits said closed femtocell.

7. The method as claimed in claim 1, wherein during said initialization of said dynamic authorization table, each of said at least an admissible user of said closed femtocell is set to have a permanent access to said closed femtocell.

8. A self-aware dynamic authorization method for closed femtocell environments, comprising:

executing initialization of a dynamic authorization table using a dynamic authorization module configured by a hardware processor, for setting an authorization record in said dynamic authorization table for each of at least an admissible user of a closed femtocell, said authorization record having a Mobile Station International Subscriber Directory Number (MSISDN) field, an International Mobile Subscriber Identity (IMSI) field, and a weight field;

executing an initial phase for learning data using the dynamic authorization module, learning to obtain an International Mobile Subscriber Identity (IMSI) or a Mobile Station International Subscriber Directory Number (MSISDN) of each non-authorized user for adding or updating a corresponding authorization record with said IMSI or said MSISDN learned by said closed femtocell through service experiences;

executing a reweighting phase using the dynamic authorization module, for reweighting each non-authorized user by dynamically adjusting a weight value for each non-authorized user, said weight value being recorded in said weight field in the corresponding authorization record; and executing an ageing phase using the dynamic authorization module, for deleting the authorization record with a least weight value from said dynamic authorization table;

wherein in each said authorization record, said MSISDN field and said IMSI field are key fields, said weight value of said weight field is dynamic accumulation of a start time and a duration, said start time is the start time when said closed femtocell most recently obtains or serves a corresponding user, and said duration is the duration of access authorized to the corresponding user.

9. The method as claimed in claim 8, wherein executing said initial phase for learning data further includes:
for each of said at least an admissible user in said dynamic authorization table, during provision of telecommunication services by said closed femtocell, detecting the admissible user using said telecommunication services to establish a message with a communication partner, and learning said MSISDN of said communication partner;
inquiring mapping relationship between said IMSI and said MSISDN of said communication partner through a mapping protocol; and
inquiring whether said IMSI or said MSISDN of said communication partner exists in one of the authorization records in said dynamic authorization table; if so, increasing said weight value of said weight field in the existing authorization record in said dynamic authorization table by a weight value of said start time; otherwise, adding a new authorization record with said IMSI or said MSISDN in said dynamic authorization table, with said weight field containing the weight value of said start time.

10. The method as claimed in claim 8, wherein executing said reweighting phase further includes:
when a handheld device enters a coverage area of said closed femtocell, said closed femtocell checking whether said IMSI or said MSISDN of said handheld device exists in one of the authorization records in said dynamic authorization table; and
if so, said closed femtocell providing an access service to said handheld device and updating said weight field in the existing authorization record by a weight value of said duration.

11. The method as claimed in claim 8, wherein executing said ageing phase further includes:
subtracting a constant value after each period of time from said weight value in said weight field of each authorization record in said dynamic authorization table; and
when said dynamic authorization table is full, deleting the authorization record with a minimum weight value in said weight field.

12. The method as claimed in claim 8, wherein during said initialization of said dynamic authorization table, said authorization record for each of said at least an admissible user is set, added or deleted by an administrator of said closed femtocell or a telecommunication service provider.

13. A self-aware dynamic authorization architecture for closed femtocell environments, comprising:
a first group of authorization records, each authorization record in said first group being set for one of at least an admissible user of a closed femtocell;
a second group of authorization records, each authorization record in said second group being learned for a non-authorized user when said closed femtocell provides a telecommunication service to said at least an admissible user; and
a dynamic authorization module configured by a hardware processor for setting said first group of authorization records and then executing an initial phase for learning data, a reweighting phase and an ageing phase to establish or dynamically adding and updating said second group of authorization records;
wherein each authorization record in said second group comprises at least a duration control field, and said dynamic authorization module executes said reweighting phase to dynamically update said duration control field in each authorization record of said second group according to a start time when said closed femtocell most recently obtains or serves a corresponding user and a duration of access authorized to the corresponding user.

14. The architecture as claimed in claim 13, wherein said first group is a queue, and contents of each authorization record of said queue are set, added, or deleted by an administrator of said closed femtocell or a telecommunication service provider.

15. The architecture as claimed in claim 13, wherein said second group is divided into an aware queue of authorization records and a service queue of authorization records, and is operated by said dynamic authorization module.

16. The architecture as claimed in claim 15, wherein each authorization record in said second group further comprises an International Mobile Subscriber Identity (IMSI) field for storing a dynamically learned International Mobile Subscriber Identity (IMSI), and a Mobile Station International Subscriber Directory Number (MSISDN) field for storing a Mobile Station International Subscriber Directory Number (MSISDN).

17. The architecture as claimed in claim 16, wherein when said dynamic authorization module executes said initial phase for learning data, if said—dynamically learned IMSI does not exist in one of the authorization records of said aware queue, said dynamic authorization module adds a new authorization record to the end of said aware queue; if said dynamically learned IMSI already exists in one of the authorization records of said aware queue, said dynamic authorization module moves the authorization record having said dynamically learned IMSI to the end of said aware queue.

18. The architecture as claimed in claim 16, wherein when said dynamic authorization module executes said reweighting phase, if said closed femtocell finds said dynamically learned IMSI of a handheld device in one of the authorization records of either said aware queue or said service queue when said handheld device enters a coverage area of said closed femtocell, said dynamic authorization module moves the authorization record having said dynamically learned IMSI to the end of said service queue.

19. The architecture as claimed in claim 16, wherein when said dynamic authorization module executes said ageing phase, said dynamic authorization module moves a first authorization record in said service queue to the end of said aware queue or deletes a first authorization record from said aware queue.

20. The architecture as claimed in claim 13, said architecture uses a dynamic authorization table to realize the authorization records of said first group and said second group, and each of the authorization records further includes a Mobile Station International Subscriber Directory Number (MSISDN) field, and an International Mobile Subscriber Identity (IMSI) field, wherein said MSISDN field and said IMSI field are key fields.

21. The architecture as claimed in claim 13, wherein said duration control field is realized by a start time field and a duration time field.

22. The architecture as claimed in claim 13, wherein said duration control field is realized by a weight field, and a weight value of said weight field is dynamic accumulation of said start time and said duration.

* * * * *